Feb. 9, 1926.
W. BOWLES
1,572,101
AUTOMOBILE WHEEL RIM
Filed June 12, 1923        2 Sheets-Sheet 2
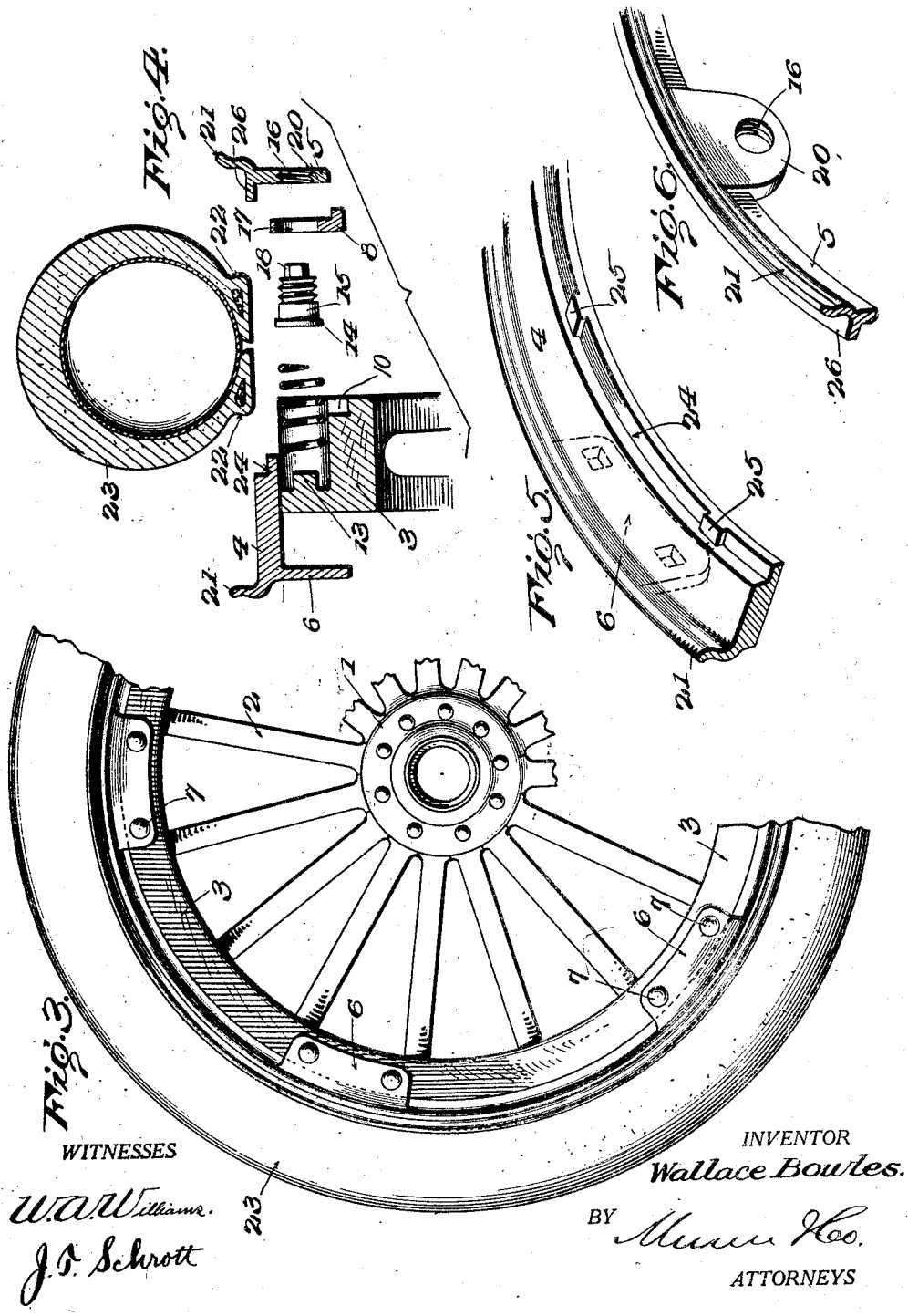
INVENTOR
*Wallace Bowles.*
WITNESSES
BY
ATTORNEYS Patented Feb. 9, 1926.

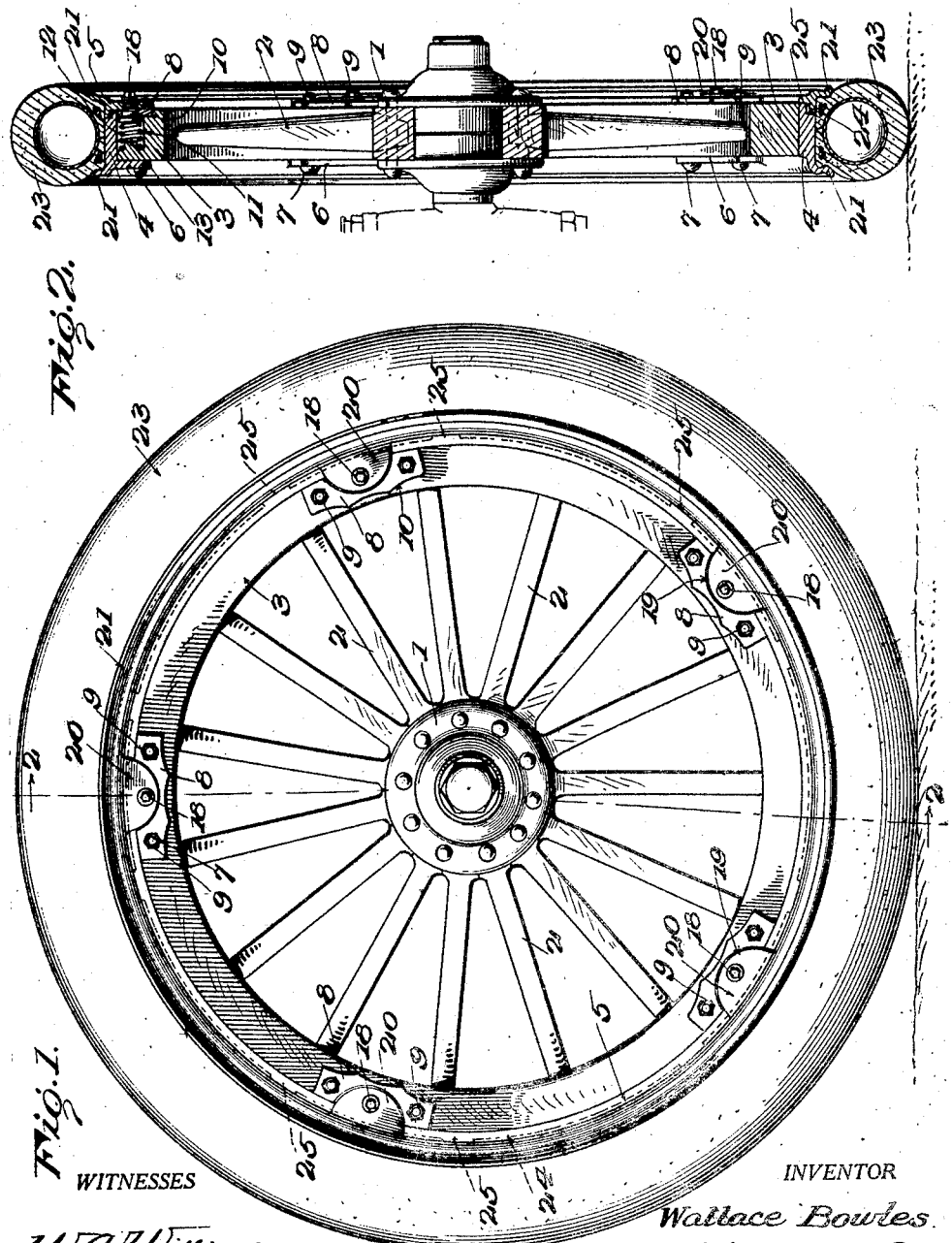

1,572,101

UNITED STATES PATENT OFFICE.

WALLACE BOWLES, OF MEADOW CREEK, WEST VIRGINIA, ASSIGNOR, BY DIRECT AND MESNE ASSIGNMENTS, OF FOUR-TWENTIETHS TO JOHN I. SCOTT, OF MEADOW CREEK, WEST VIRGINIA, AND ONE-TWENTIETH TO JAMES E. DECKER, OF SACOMA, WEST VIRGINIA.

AUTOMOBILE WHEEL RIM.

Application filed June 12, 1923. Serial No. 644,992.

*To all whom it may concern:*

Be it known that I, WALLACE BOWLES, a citizen of the United States, and a resident of Meadow Creek, in the county of Summers and State of West Virginia, have invented certain new and useful Improvements in Automobile Wheel Rims, of which the following is a specification.

My invention relates to improvements in automobile wheels and it consists of the constructions, combinations and arrangements herein described and claimed.

An object of the invention is to provide an automobile wheel having an improved rim by the use of which the tire may be expeditiously applied and removed.

Other objects and advantages of the invention will appear in the following specification, reference being had to the accompanying drawings, in which:

Fig. 1 is a side elevation of an automobile wheel embodying the improved rim,

Fig. 2 is a central vertical section thereof taken on the line 2—2 of Fig. 1,

Fig. 3 is a partial side elevation showing the other side of the wheel in Fig. 1, Fig. 4 is a detail sectional view showing various parts of a portion of the improved rim disassembled, Fig. 5 is a detail sectional perspective of a part of the fixed rim section, Fig. 6 is a detail sectional perspective view of a part of the cooperating gripper ring.

Attention is first directed to Fig. 1. The hub 1, spokes 2 and felly 3 represent any conventional automobile or motor vehicle wheel. It is to the felly 3 that the invention is applied.

The invention comprises the fixed rim section 4, which is so named because it is applied directly and fixed to the felly 3, and the removable rim section 5. These two parts, together with the means by which the ring 5 is actuated, constitute the improved rim, but the various parts must be designated by different names for the purposes of distinction.

The fixed rim section 4 has a plurality of flanges 6 which rest against the inside of the felly 3, as shown in Figs. 2 and 3. It is through these flanges that bolts 7 pass and serve to hold the rim section 4 fixedly in place on the felly. The bolts 7 also pass through the felly where they receive swivel plates 8, nuts 9 being screwed on the bolts against these plates to hold the latter against the front of the felly. The swivel plates rest in recesses 10 on the front face of the felly, and when the nuts 9 are tightened down all possibility of the swivel plates moving is removed.

Formed in the felly beneath each of the swivel plates is a depression 11 which is occupied by a spring 12. This spring is seated upon a central stud 13 which is formed in the making of the depression. The purpose of the spring in each instance is to press outwardly upon the head 14 of a screw plug 15. The screw plug passes through an opening 16 in the gripper ring 5, this opening being threaded as shown in Fig. 4. The screw plug also passes through an opening 17 in the swivel plate 8, but inasmuch as this opening is substantially of the size of the plug and smaller than the head 14, the arrangement provides a swivel mounting which becomes useful in the subsequent operation.

It is to be observed that the plug 15 terminates in a non-circular end 18. This end is intended to receive a suitable wrench. The reader can readily understand that by applying such a wrench (not shown) to the end 18, and turning the swivelled screw plug 15, the latter will be made to draw the removable rim section 5 toward the felly. In making this statement it is presumed that the rim section 5 has been applied to the side of the felly.

Each swivel plate 8 has an arcuate recess 19 intended to receive a similarly shaped lug 20 on the removable rim section. It is through this lug that the threaded opening 16 is formed and through which the screw plug 15 passes so that the wrench end 18 may be accessible from the outside, as plainly shown in Figs. 1 and 2. Both the rim sections 4 and 5 have flanges 21 for the purpose of engaging the beads 22 of the tire 23. The flanges 21 might have any one of a number of shapes, for example, they might be curved inwardly so as to more adequately grip a tire having beads of a similar formation. The shape of the flanges is immaterial. The purpose is to hold the tire on the rim.

It is to be observed that the rim section 4 has an annular reduction 24 on that side adjacent to the rim section 5. This reduction is shown in detail in Fig. 5. Here the reduction is shown to be provided with a plurality of lugs 25 upon which the inner flange 26 of the ring 5 is adapted to seat when the parts are assembled. The rim section 5 is of an L shape in cross section, and when the parts are assembled as stated, the exposed depending part of said rim section covers any space that would be left by virtue of the presence of the lugs 25. These lugs are for the purpose of assisting in centering the ring on the reduction 24.

In considering the operation, the reader may first regard the rim section 4 as being a part of the felly 3 inasmuch as it is intended that the bolts 7 shall hold the rim section in place besides acting as keepers for the removable swivel plates 8. The reader must not understand from this that the plates 8 are removed with each tire removing operation. When once put in place, they are intended to stay there.

The plates 8 furnish swivel mountings for the screw plugs 15 which are held in their proper positions both by the heads 14 and springs 12 therebehind. The threaded parts and wrench ends of the screw plugs are exposed through the openings 17 in the swivel plates. Upon desiring to secure a tire 23 on the rim section 4 of the automobile wheel, it is of course necessary to first apply the tire and then the rim section 5.

This rim section is so applied that each one of the threaded openings 16 in the lugs 20 comes over one of the exposed screw plugs. The operator now takes a wrench, applies it to the end 18 and gives the plug a turn. He will find that the resilient mounting of the screw plug which the spring 12 in each case affords will be of material assistance to him in getting the threads started in the opening 16. By combining both a pressing motion on the lug 20 of the rim section 5, and a turning motion on the wrench, the threads will soon engage and cause the rim section 5 to move toward the felly where the flange 21 binds the tire in place.

While the construction and arrangement of the improved automobile wheel rim as herein described and claimed, is that of a generally preferred form, obviously modifications and changes may be made without departing from the spirit of the invention or the scope of the claims.

I claim:—

1. The combination of a felly having a plurality of depressions, a rim section fitted on the felly and having a flange to be engaged by one side of a tire, a removable rim section having a flange to engage the opposite side of the tire, lugs on said removable rim section having threaded openings coinciding with said depressions, and screw plugs having a swivelled mounting in said depressions and being engageable with said threaded openings to draw the removable rim section toward the tire and bind it in place.

2. In combination with the felly of a vehicle wheel said felly having depressions, a rim section fixed on the felly and having a flange to be engaged by one side of a tire, a removable rim section having a flange to engage the other side of a tire, lugs depending from said removable rim section having threaded openings coinciding with the depressions, screw plugs situated in the depressions for engagement with said openings to draw the removable rim section toward the tire, plates against the felly by which the plugs are swivelly mounted, and means in the depressions furnishing a resilient backing for the plugs to hold them against the plates.

3. The combination of a felly, a fixed rim section, a removable rim section which is adapted to engage a side of a tire received by the fixed rim section, an arrangement of screw plugs operative in the felly to engage the removable rim section and permit forcing said rim section toward the tire in order to hold it in place, and resilient backing means for the plugs permitting pressing in on the removable rim section while turning the plugs to assist in getting the threads started.

4. In combination with a felly provided with depressions merging with recesses in the side of the felly each depression having a stud at the base, an apertured swivel plate seated in each recess, a rim section fixed on the felly having flanges at the side opposite to the swivel plates, means transfixing the flanges, felly and each plate to hold the parts together, a removable rim section adjacent to the swivel plates having lugs with threaded openings, a plug situated in each depression having a smooth portion occupying the respective plate with a head on the inside and a screw portion occupying the opening of the lug, said plugs each having an exposed non-circular end for turning, and springs in the depressions seated on the studs and bearing against the plugs.

5. In combination with a felly provided with depressions communicating with recesses at one side, swivel plates occupying the recesses and in turn having recesses, a rim section on the felly having a flange to receive one side of a tire, means to hold the rim section and swivel plates in fixed positions on the felly, a removable rim section to engage the other side of the tire having lugs to occupy the swivel plate recesses and thereby prevent circular motion of the removable rim, and means occupying the depressions working through the swivel plates to reach the lugs and bind the removable rim section in position against the tire.

WALLACE BOWLES.